Oct. 24, 1961     L. B. SMITH     3,005,593
GOVERNOR FOR LAWN SPRINKLERS AND THE LIKE
Filed June 19, 1958     3 Sheets-Sheet 1
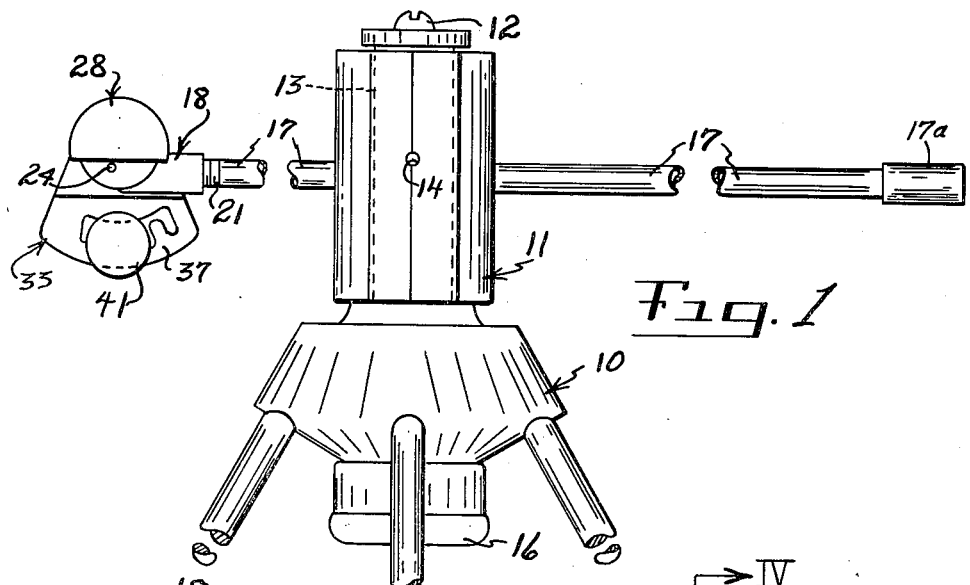
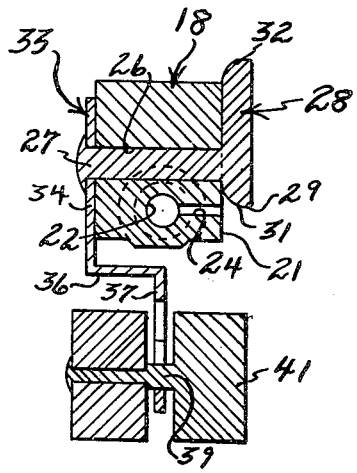
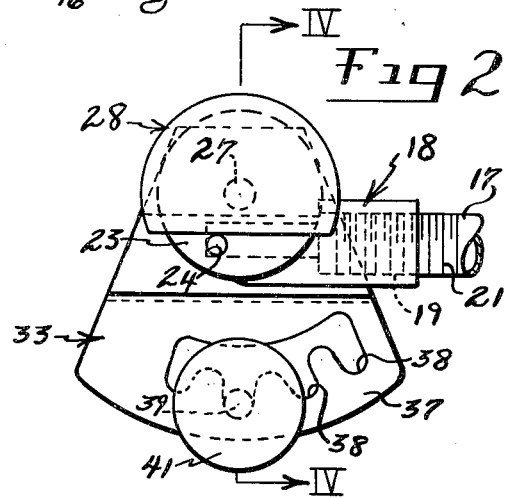
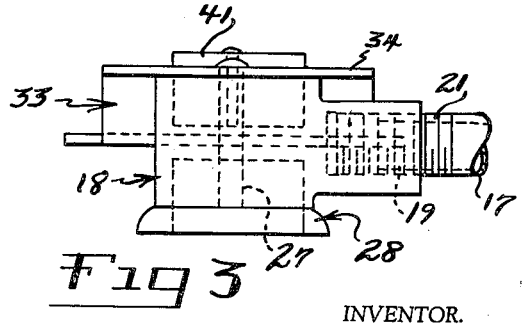
INVENTOR.
Lloyd B. Smith
BY
Jennings, Carter & Thompson
Attorneys Oct. 24, 1961   L. B. SMITH   3,005,593
GOVERNOR FOR LAWN SPRINKLERS AND THE LIKE
Filed June 19, 1958   3 Sheets-Sheet 2
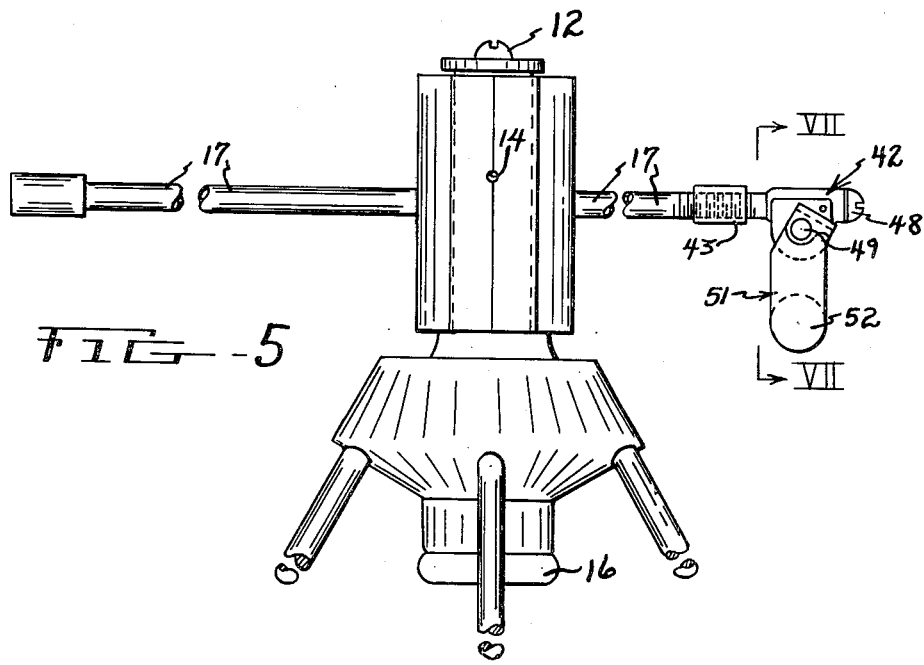
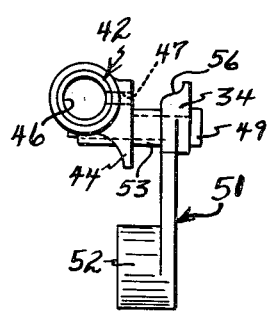
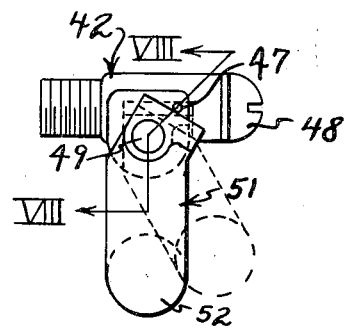
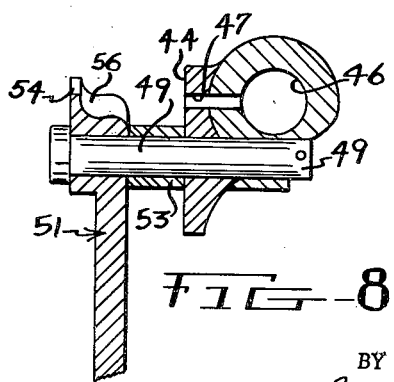
INVENTOR.
Lloyd B. Smith
BY
Jennings, Carter & Thompson
Attorneys Oct. 24, 1961　　　　　L. B. SMITH　　　　　3,005,593
GOVERNOR FOR LAWN SPRINKLERS AND THE LIKE
Filed June 19, 1958　　　　　　　　　　　　3 Sheets-Sheet 3
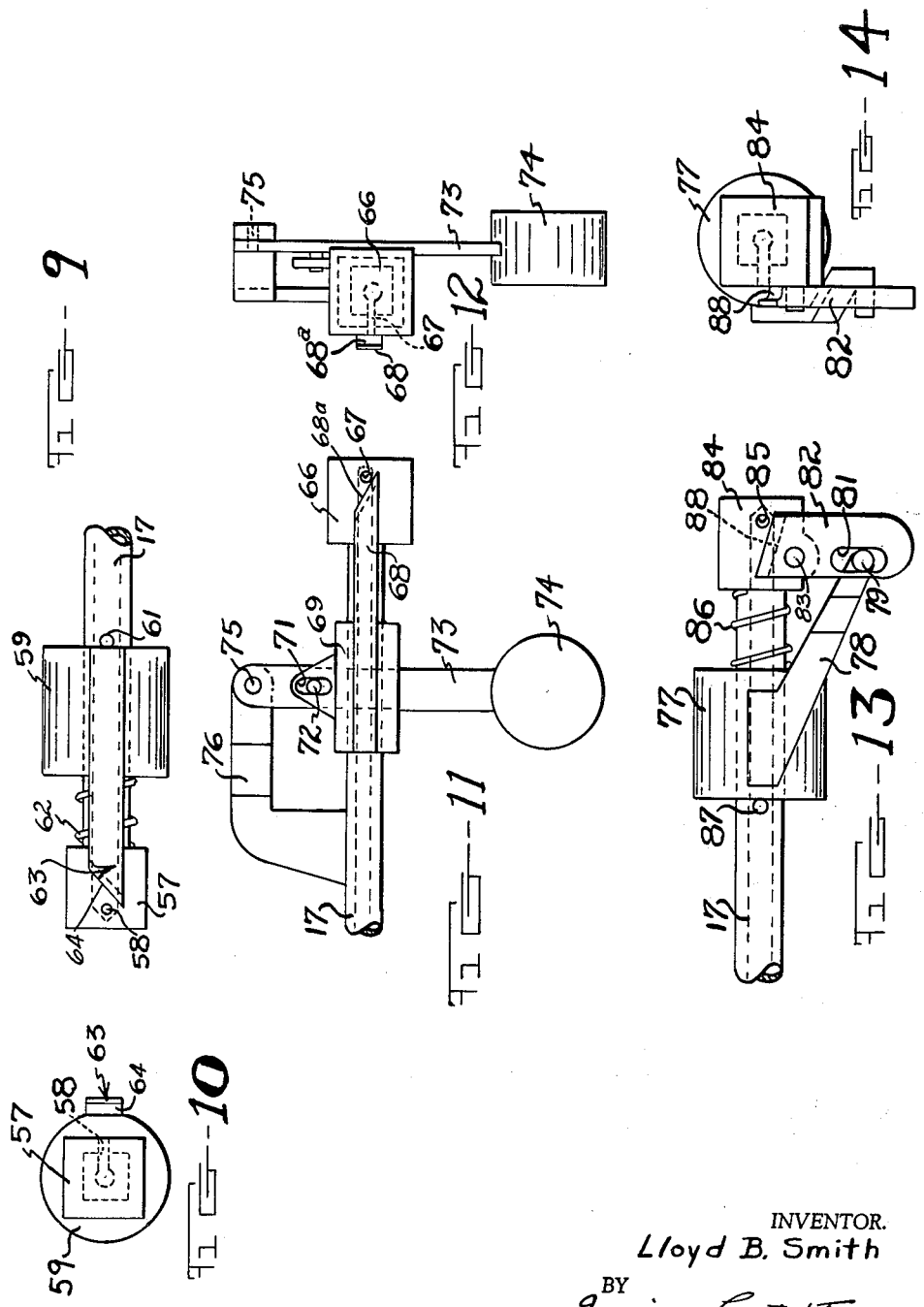
INVENTOR.
Lloyd B. Smith
BY
Jennings, Carter & Thompson
Attorneys

United States Patent Office 3,005,593
Patented Oct. 24, 1961

3,005,593
GOVERNOR FOR LAWN SPRINKLERS AND THE LIKE
Lloyd B. Smith, 824 N. 31st St., Birmingham, Ala.
Filed June 19, 1958, Ser. No. 743,098
11 Claims. (Cl. 239—252)

This application is a continuation-in-part of my co-pending application, Serial No. 582,858, filed May 4, 1956, "Governor for Lawn Sprinklers and the Like," now abandoned.

My invention relates to speed governors for rotating devices such as lawn sprinklers of the kind having a spray head which is rotated by means of a reaction jet.

In developing a suitable and practical commercial form of lawn sprinkler, especially one which sprays in a square or rectangular pattern, I have found that it is desirable to regulate the speed of rotation of the sprinkler head. The need for speed rotation in such sprinklers lies primarily in the fact that water in varying quantities and under different pressures, both of which ordinarily are encountered in the operation of lawn sprinklers, causes the main sprinkler jets to deliver widely varying stream shapes which follow widely varying trajectories. It of course is desirable that a sprinkler designed to deliver water over, for instance, a square pattern do so over areas of maximum size down to minimum size with as nearly even distribution of water per square foot as possible. The area to be covered is varied by changing the volume of water supplied to the sprinkler, and the main jets remain the same size. Under these conditions it will be apparent that the greater the volume and pressure of the water the faster the sprinkler head tends to turn. For an all purpose sprinkler, outlying areas thus may be over-watered while close in areas may be underwatered, or vice-versa. At all events, whether the sprinkler delivers the usual circular pattern or odd shaped patterns I have found that speed regulation is essential to make such a sprinkler practical under the varying conditions of use.

In view of the above my invention contemplates a governor for rotary head sprinklers which shall be effective to hold the speed of rotation of the rotary head at the optimum rate for substantially any given water pressure and volume, thereby to deliver water evenly over large as well as small areas.

A prime object is to provide a governor for sprinklers which shall be gravity actuated, and one which embodies a minimum number of working parts.

Another object is to provide a governor which includes a reaction jet deflecting member having an undercut edge which moves to interrupt the jet, which type of edge I have discovered reduces the jet action of the stream without reducing materially the volume of water flowing therethrough and without cutting it off suddenly, and which thereby eliminates intermittent rotation of the head, assuring a more even distribution of water from the continuously rotating head.

A still further object is to provide a sprinkler of the character designated which shall embody in one modification an adjustable weight which is permanently secured to the governor mechanism, eliminating the likelihood of losing the weight and yet which may quite readily and quickly be shifted to change its position.

Apparatus illustrating features of my invention is shown in the accompanying drawings forming a part of this application in which:

FIG. 1 is a side elevational view of a sprinkler with one embodiment of my improved governor applied to the reaction jet arm thereof;

FIG. 2 is an enlarged side elevational view of the governor unit proper;

FIG. 3 is a plan view of the unit shown in FIG. 2;

FIG. 4 is a detail sectional view taken generally along line IV—IV of FIG. 2;

FIG. 5 is a view generally similar to FIG. 1 and showing a modified form of my improved governor applied to a sprinkler;

FIG. 6 is an enlarged side elevational view of the governor shown in FIG. 5, the full lines indicating the position of the moving part when the sprinkler is substantially at rest and the dotted line position indicating the position of the moving part of the governor with the sprinkler in rotation;

FIG. 7 is a detail sectional view taken generally along the line VII—VII of FIG. 5 and drawn to a slightly enlarged scale;

FIG. 8 is a detail sectional view taken generally along the line VIII—VIII of FIG. 6 and drawn to a further enlarged scale;

FIG. 9 is a side elevational view of a further modified form of my improved governor showing the same in position on the end of a reaction jet arm of the sprinkler head;

FIG. 10 is an end elevational view of the modification shown in FIG. 9;

FIG. 11 is a side elevational view of a further modified form of my invention;

FIG. 12 is an end elevational view of the modification shown in FIG. 11;

FIG. 13 is a side elevational view of a still further modified form of my improved governor; and, FIG. 14 is an end elevational view of the modification shown in FIG. 13.

Referring now to the drawings for a better understanding of my invention I show my improved governor associated with a form of sprinkler which for purposes of illustration may be the type sprinkler shown in my co-pending application, Serial No. 577,592, filed April 11, 1956, subject Lawn Sprinkler, now Patent No. 2,884,202. However, as the description proceeds it will be readily apparent that my improved governor is equally adapted to practically any type of sprinkler or the like having a rotary head. Therefore, showing it in association with the particular kind of sprinkler is for purposes of illustration only.

In the drawing the sprinkler embodies the base or stationary portion 10 and has thereon a rotary head 11. The head may be held in place by means of a screw 12 which fits into a vertically disposed column 13 upstanding from the base. The rotary head carries main jets 14, one of which is shown and the main jets receive water upwardly through the column 13 through a water connection 16. The head may also carry jet water supply arms indicated at 17 and which are supplied with water from the hollow column 13 and an annular passage in the column, not shown, as will be understood. My improved governor is adapted for attachment in suitable manner to the outer end of the reaction jet arm or tube 17 as will now be explained.

My improved governor may consist of a fitting indicated generally by the numeral 18 and which has a threaded portion 19 for securing the same onto the threaded end 21 of the arm 17. The fitting 18 is bored to provide a water passage 22. Passing through a generally flat side 23 of the body 18 and in communication with the water passage 22 is a reaction jet 24. It will be understood that water issuing from the jet 24 under pressure causes the entire head 11 to rotate.

The body of the fitting is provided with a cross opening 26 which may be generally normal to the flat surface 23. Rotatably mounted in the opening 26 is a pintle 27. Secured to the pintle 27, either by being formed integrally therewith or in any other desired manner, is a reaction jet deflecting member 28.

As best shown in FIGS. 2 and 4, the deflecting member 28 may be generally of disc shape and has a lower edge portion 29 which is adapted to be rocked as will be explained into at least partial stream blocking relation relative to the jet 24. It will further be noted that the edge 29 is undercut, preferably in the modification being described, being undercut on a curve as indicated at 31. Still further, the entire curved periphery of the cut-off plate 28 may likewise be undercut as shown at 32. The purpose of this will be explained later.

Securely mounted non-rotatably on the opposite end of the pintle 27 is a weight bracket indicated generally by the numeral 33. The bracket comprises a section 34 secured to the pintle, an inturned section 36, and a slotted section 37. The slotted section has a number of seats 38 therein. The seats are adapted to receive the shank portion 39 of a dumbbell shaped weight 41. In FIG. 4 it will be seen that the weight 41 preferably is fabricated in two parts and the parts secured together after assembling in the slot.

From the foregoing the method of constructing and using my improved governor may now be readily explained and understood. It will be appreciated that the parts are assembled rather loosely so that the pintle is quite free to turn in the opening 26 in response to centrifugal force on the weight 41. With the parts assembled as shown and with a supply of water connected at 16 it will be seen that water passes into the opening 22 of the fitting and then out the jet 24, causing the entire head 11 to rotate. In view of the fact that the jet is slightly off-set relative to a vertical line passing through the pintle 26, by shifting the weight 41 into the righthandmost slot 38 as viewed in FIGS. 1 and 2, it will be apparent that the edge 29 is brought closer toward the jet than when the weight is in the position shown in the figures. Therefore, as the jet causes the head to rotate and with the weight in the righthandmost slot 38 the speed of rotation of the head is slowed down. This is due to the fact that as the speed increases the entire weight bracket 33 and hence its deflecting member 28 tend to rotate clockwise as shown in the drawings. This brings the undercut curved edge 31 gradually into contact with the stream of water issuing from jet 24, changing it from a solid stream to a spray-like stream and thus gradually slowing the speed of rotation. In actual practice I find that the assembly seeks a position where the edge of the curved portion 31 next adjacent the flat part 23 of the fitting stays very close to the adjacent edge of the jet opening, whereby the slightest increase in speed causes it partially to disrupt the jet stream, bringing the speed back to the predetermined rate as permitted by the weight. By moving the weight into the lefthandmost opening 38 the head can rotate faster than when it is in the righthandmost one, thus permitting the delivery of water to smaller areas.

In use I have found that my invention is extremely accurate while at the same time being very simple of manufacture and trouble free in operation. It will be apparent that once the weights are assembled in the slot they cannot fall out and hence there are no parts to lose or become damaged. Further, by undercutting or curving the edge 32 of the rounded part of the cutoff member 28 I find that any water from the jet that might seep between the member 28 and the flat side 23 of the fitting is discharged behind the moving arm 17 rather than being thrown radially therefrom. This water therefore is added to the water delivered by the sprinkler in a good pattern rather than being thrown outwardly by pure centrifugal force.

In FIG. 1 of the drawing I have shown two of the arms 17 but only one of the governor units. In practice I find that the extra arm 17 may be blanked off or sealed with a cap 17a since a single jet is sufficient for the average small lawn sprinkler.

Referring now to FIGS. 5 to 8, inclusive, I there illustrate a modified form of my invention. In this modification the fitting 42 is screwed in water tight connection on the end of the arm or conduit 17 through a sleeve 43 and may be provided with a flat side 44. The bore 46 of the fitting to which water is supplied has a reaction jet opening 47 drilled thereinto whereby a reaction stream is directed outwardly. The end of the fitting 42 may be closed by a cleanout screw 48.

Passing through a depending part of the fitting and made fast thereto in any suitable manner and projecting outwardly of the face 44 is a bearing pin 49. Mounted for rotation on the pin is an arm 51 which carries at its lower end an integrally formed weight 52. A spacer sleeve 53 may be provided to hold the upper end of the arm in spaced relation to the outer end of the jet opening 47.

The upper end of arm 51 is enlarged as indicated at 54. A curved water deflecting surface 56 is provided on the inner surface of the portion 54 in position, when the portion 54 rocks as will be explained, to be struck at least in part by the stream of water issuing from jet opening 47.

As best shown in FIGS. 5 and 6 arm 51, weight 52, portion 54 and surface 56 all are so proportioned that when the sprinkler is sitting level and at rest the stream of water issuing from jet opening 47 passes over the upper end of the enlarged part 54. However, as soon as the sprinkler starts to rotate gravity moves the weighted end of the arm outwardly, that is to the right, as viewed in FIGS. 5 and 6, thereby positioning the surface 56 so that it commences to be struck by the stream. This has the effect as heretofore stated of removing some of the kinetic energy from the reaction stream and converting it to a spray-like stream, slowing down the arm 17. In actual practice with sprinklers commercially produced by the modification under description it is found that the spacing of the deflecting surface 56 from opening 47 has the advantage of inspirating a flow of air upwardly and over the surface 56, eliminating any dripping of water which might occur if the deflecting plate is placed close to the surface 44. Furthermore, the fact that it is possible and desirable to space the surface 56 from the end of the jet opening 47 illustrates the point that the principal purpose of the deflecting surface 56 is not to valve or cut off the flow of water as has heretofore been attempted in governors of this general type, but on the other hand is to strike the stream of water issuing from the jet and to reduce its kinetic energy, thereby reducing its power to rotate the head. This results in a decided improvement in constancy of rotation of the head. Furthermore, as has been stated, this converts the solid, eroding stream of water into a spray-like stream, further assuring an even spread of water over the ground.

In FIGS. 9 and 10 I show a further modified form of my invention in which the arm 17 is provided on its outer end with a fitting 57 having therein a reaction jet opening 58.

Slidably mounted on the arm 17 is a weight 59. The weight 59 is biased to the right as shown in FIG. 9 against a stop 61 by means of a light spring 62. Mounted on the side of the weight 59 is the jet stream deflecting member 63 which has a rounded or undercut water deflecting surface 64.

In operation, as the sprinkler arm rotates weight 59 moves out against the force of the spring 62, causing the water to strike the surface 64 as already has been explained.

In FIGS. 11 and 12 I show another modification of my invention in which the arm 17 is provided with a fitting 66 having a passage therethrough and which has a jet opening 67 in communication therewith through which a reaction jet stream of water is discharged.

The deflecting member 68 in this case may be mounted on a sleeve 69 slidable axially on the arm 17. An upper part of the sleeve 69 has therein a slot 71 into which fits a pin 72. Pin 72 is mounted on a weight arm 73, there being a weight 74 on the lower end of the arm. The arm 74 is pivoted at 75 to a bracket arm 76 in turn mounted on arm 17.

The deflecting member 68 is provided with a curved surface 68a which is adapted as has already been explained to contact the stream issuing from jet opening 67, to bring about the advantages heretofore specified.

A final modification is shown in FIGS. 13 and 14. In this instance a sliding weight 77 surrounds the arm 17 and carries an arm 78 projecting outwardly therefrom. The arm 78 is connected by a pin 79 to a slot 81 in an arm 82 pivoted at 83 to a fitting 84. The fitting 84 has a reaction jet opening 85 in communication with the arm 17. A spring 86 urges the weight 77 inwardly against a stop 87.

The upper end of arm 82 has a surface 88 thereon curved as has been indicated, and located in position to strike the stream of water as the speed of the arm increases and as the weight 77 moves outwardly toward the fitting 84.

From the foregoing it will be apparent that I have devised an improved governor for accurately controlling the speed of rotating fluid jet actuated members such as lawn sprinklers and the like. In actual practice and in mass production my invention has proved to be extremely satisfactory.

At the present time the preferred commercial production is of that modification shown in FIGS. 5 to 8 inclusive, although that modification shown in FIGS. 1 to 4, inclusive, also has been commercially produced. It will be apparent to those skilled in the art that my invention is particularly free from structural complications. Furthermore, the kind of governor units shown in FIGS. 1 and 5 may be applied to many existing sprinklers simply by screwing the same onto the ends of the arms or conduits 17. My invention is further particularly characterized by the fact that instead of valving the jet stream to cut it off or reduce its volume, speed regulation is obtained by removing some of the kinetic energy from the jet stream by positioning a deflecting member in the path of the stream, the rate of flow remaining substantially undisturbed. My invention thus differs radically from most types of governors which have some form of valve actually to cut off the flow of water to the reaction jet. In the latter instance it has ben found that a jerky, non-uniform rotation of the sprinkler head takes place. With my improved governor, however, an even, constant rotation is provided.

While I have shown my invention in several forms, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In a governor for a rotary member propelled by fluid jet stream discharging from the rotary member, a movable member having a portion spaced outwardly away from the point of discharge of the jet stream discharging from the rotary member and disposed partially to deflect the stream and thereby decrease its propelling force, and centrifugally actuated means operatively connected to the movable member to move the same into contact with the jet stream upon rotation of the rotary member at greater than a predetermined speed.

2. Apparatus as defined in claim 1 in which the centrifugally actuated means comprises a weight, and means for supporting the weight in different positions relative to the movable member whereby in response to centrifugal force the spaced movable member partially deflects the jet stream at different predetermined speeds of rotation of the rotary member.

3. In a governor for rotary sprinklers of the kind having a driving jet stream discharging from a side of a rotary arm, a jet stream deflecting member pivotally mounted on the arm and having a portion spaced outwardly away from the point of discharge of the jet stream from the rotary arm and disposed at least partially to deflect the stream issuing from the jet opening thereby to decrease its driving force, and a weight operatively connected to the deflecting member for moving the same into deflecting position relative to the jet stream in response to rotation of the arm at greater than a predetermined speed.

4. The combination with a sprinkler of the kind having an opening for discharging a reaction jet stream located in a rotary arm, of a governor comprising a pintle mounted on the arm near the jet stream and generally axially parallel to the jet stream, a jet stream deflecting member on the pintle having an edge spaced outwardly away from the point of discharge of the jet stream from the rotary arm and disposed upon rotation of the member to move at least partially into position to be struck by the jet stream, and a weight mounted on the deflecting member in position for centrifugal force to move the weight thereby to rotate the member into deflecting contact with the jet stream.

5. Apparatus as defined in claim 4 in which the weight is adjustable on said member thereby to select the speed at which the deflecting member commences to contact the jet stream.

6. A governor and reaction jet assembly for rotary lawn sprinklers comprising a fitting adapted to be secured water tight onto the end of a rotatable water arm, a generally flat surface on one side of the fitting, there being an opening in said flat surface into the fitting in communication with the water supply arm and constituting means for discharging a reaction jet stream of water from the assembly, a pin projecting from the fitting and lying generally axially normal to the flat surface, a jet deflecting plate fixed to the pin adjacent the flat surface in position for an edge thereof at least partially to deflect and block the jet upon rotation of the plate, the edge of said deflecting plate being undercut on the side thereof struck by the jet stream thereby to exert a spreading action on the stream, a bracket secured to the opposite end of the pin and having a part extending below the fitting, and a weight in the lower part of the bracket effective upon rotation of the assembly to move the plate toward jet stream deflecting position.

7. A device as defined in claim 6 in which all of the edges of the deflecting plate are undercut on a curve to define a body having edges which curve outwardly away from the fitting.

8. In fluid sprinkling apparatus embodying a substantially horizontally disposed conduit mounted for rotation in a generally horizontal plane, said conduit having a laterally arranged opening therein in communication with the conduit disposed to discharge a reaction jet stream thereby to drive the conduit, a member carried on the rotating conduit and having a portion spaced outwardly from the outer end of said opening, there being a jet stream deflecting surface on said spaced portion disposed to be moved into position to engage the jet stream issuing from the opening and thereby to decrease the driving force of the stream, and centrifugally actuated means operatively connected to said member effective to move said deflecting surface into contact with said jet stream when the rotary conduit reaches predetermined speed.

9. Apparatus as defined in claim 8 in which the centrifugally actuated means is a weight slidably mounted on the conduit, means operatively connecting said member to said weight, and a spring opposing the outward movement of the weight responsive to rotation of the conduit.

10. Apparatus as defined in claim 8 in which said member is carried by a sleeve slidable axially on the conduit, and in which the centrifugally actuated means operatively connected to the member is a weight suspended below the conduit.

11. A fluid sprinkling device comprising a substantially horizontally disposed conduit, said conduit being mounted for rotation about a vertical pivot, said conduit having a laterally arranged jet opening through which is discharged a stream of fluid to drive the conduit, an imperforate deflecting member mounted on said conduit on a pivot and having a portion spaced outwardly away from and movable in front of said jet opening, and a centrifugally controlled weight attached to said deflecting member, whereby as said conduit rotates about its pivot said weight is projected outwardly by centrifugal force to cause said deflecting member to pass in front of said jet opening and thus change the driving effect of the fluid stream being discharged through said jet opening.

References Cited in the file of this patent

UNITED STATES PATENTS

| | | |
|---|---|---|
| 442,462 | Sharples | Dec. 9, 1890 |
| 1,146,663 | Stetter | July 13, 1915 |
| 2,021,710 | Wilson | Nov. 19, 1935 |
| 2,176,243 | Braungart | Oct. 17, 1939 |

FOREIGN PATENTS

| | | |
|---|---|---|
| 882,332 | Germany | July 9, 1953 |